United States Patent Office 3,210,173
Patented Oct. 5, 1965

3,210,173
ASPHALT AGRICULTURAL MULCH
Thomas M. Mozell, Somerset, N.J., assignor to Esso Research and Engineering Company, a corporation of Delaware
No Drawing. Filed Feb. 27, 1962, Ser. No. 176,132
6 Claims. (Cl. 71—2.5)

The present invention is concerned with establishing and sustaining and promoting plant growth utilizing asphaltic emulsions. In accordance with the present invention, an asphaltic emulsion containing an acid such as gibberellic acid is used in a manner to substantially enhance and maintain agricultural growth.

It is well known in the art to use various agricultural growth promoters, particularly in aqueous solutions. It has also been suggested in the art to use various asphaltic emulsions for the purpose of controlling and improving the moisture content of the seed area. In accordance with the present invention, not only is the moisture content of the seed area controlled, but also the agricultural growth materially improved.

Millions of acres of potentially valuable grazing lands in the western half of the United States, along with areas even more vast in other countries, normally do not receive sufficient rainfall to reseed and establish grass crops suitable to maintain livestock within economically feasible geographical limits. Imprudent management in marginal cropping areas and overgrazing of poorly established grasslands followed by wind erosion has only served to accentuate the problem. Attempts to seed or reseed these semi-arid lands with suitable range grasses have resulted in the expediture of large sums in labor and material. Even so, the seeding techniques employed in the past have been only about 10 to 30% successful in the moisture limited areas.

It has now been discovered that the moisture necessary for both seed germination and early plant growth can be maintained in the seed bed by applying certain asphalt emulsions over such seed beds according to the methods hereinafter set forth in detail.

Asphalt emulsions which are suitable for use with this invention may be either acidic (cationic) or basic (anionic) although the acidic emulsions are preferred. Both are asphalt-in-water emulsions. Typical specifications for both types are listed in the following table.

TABLE I

Characteristics and composition of acidic and basic emulsions

| | Basic | Acidic |
|---|---|---|
| Emulsion Characteristics: | | |
| Viscosity, Saybolt Fural at 77° F | 20–200 | 20–200 |
| Residue (by distillation), Wt. percent | 57–70 | 57–70 |
| Settlement, 5 days, Wt. percent | 0–3 | 0–3 |
| Residue Characteristics: | | |
| Penetration at 77° F., 100 g.; 5 sec | 85–200 | 10–200 |
| Solubility in CS$_2$, percent | 97+ | 97+ |
| Ductility at 77° F., cm | 40+ | 40+ |
| Softening Point, ° F | 100–125 | 100–175 |
| Composition, Wt. percent: | | |
| Water | 30–43 | 30–43 |
| Asphalt | 57–70 | 57–70 |
| Emulsifier (Preferably polyamines for acidic emulsions, fatty acids for basic): | | |
| NaOH | .6–.8 | |
| HCl (36%) | | 0.1–0.4 |

Suitable emulsifying agents for use in preparing these emulsions include the following:

CATIONIC AGENTS (1) Primary, secondary, tertiary, and polyamine salts such as the diamine dichloride,

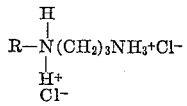

where R is an alkyl chain with 16–18 carbon atoms. In general, the alkyl chains of the amines may contain 8–22 carbon atoms with 16–18 being preferred.

(2) Amines such as those used in forming the salts of (1) condensed with 1–10 moles of ethylene oxide per mole of amine such as

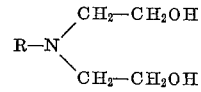

where R is as defined in (1).

(3) Quaternary ammonium salts such such as

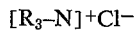

(4) Dimethylated amine salts such as

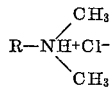

(5) Aromatic amine salts and cyclic amine salts.
(6) 2-imadazoline.

ANIONIC AGENTS

Alkali metal salts of fatty acids such as

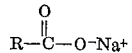

where R is an alkyl chain with 8–22 carbon atoms, preferably 14–18. The potassium salt may also be used. Also, the emulsifying agent is not always one specific compound but could be a mixture of salts of fatty acids in which R varied in length. Examples of these are a sodium salt of pine wood ligin and a salt of a long chain acid resin from the destructive distillation of pine wood stumps; also fine clays such as bentonite can be used.

Whereas, the actual emulsifying agents for the cationic and anionic emulsions are the amine salts or fatty acid salts, these salts are usually formed in the aqueous emulsifying solution by reaction of the amine with an acid such as HCl and the fatty acid with a base such as NaOH. Possible substitutes for the HCl and NaOH therefore exist. Acetic acid (CH$_3$COOH) or nitric acid (HNO$_3$) could be used instead of HCl on a mole per mole basis. Also, KOH could be used instead of NaOH although the latter is cheaper.

Other petroleum products may be used in lieu of asphalt in these emulsions or as non-emulsified liquids providing they are of a suitable viscosity for application by spraying, form a continuous film which is penetrable to young seedlings but essentially impenetrable to water, and do not possess a high degree of herbicidal properties. Suitable petroleum products for this use include crude oils low in sulfur content, petroleum waxes, wax and asphalt mixes, and residua.

For the purposes of this invention, the emulsions set forth in Table I may, for want of a better term, be referred to as emulsion concentrates. For the purposes of this invention, such emulsions are further diluted with water as for example with 0.4 to 3 parts of water prior to application. For minimizing evaporation losses with soils in general, it has been found that optimum results are obtained when about 1.0 to 1.70, preferably about 1.3, volumes of water are employed per equivalent volume of emulsion concentrate. More specifically, maximum effectiveness in retarding evaporation from a silt loam type soil while using a minimum amount of emulsion is obtained by spraying onto the soil an emulsion as characterized in Table I diluted to the extend of 1.18±0.25 to 1.47±0.25 volumes of water per volume of emulsion, such dilution increasing linearly from the low dilution to the higher dilution as the soil density decreases from about 1.60 to 1.20 gm./cm.$^3$. These emulsions may be prepared in the conventional manner as follows.

The emulsifying solution of the desired formulation at a temperature of 120° to 150° F. and the asphalt at a temperature of about 240° F. may be fed in separate streams to a conventional colloid mill. Other conventional techniques for effecting emulsification may be employed if colloid milling is not convenient. The preferred emulsification temperature is about 180°–190° F. a thin continuous film of such emulsions will retard evaporation rates by 90 to 99% as compared to bare soil. Such emulsions (based on undiluted emulsion concentrate) should be applied at a rate in the range of 150 to 1000, preferably 300 to 750 ga. per acre of coverage.

Thus, in accordance with the present invention, gibberellic acid (Eastman Distillation Products No. 7444–85%) is used in an emulsion such as described above, particularly in an acidic type emulsion. It is preferred that the amount of asphalt in the mulch range from about 25 to 60% by weight as compared to the water present, preferably from about 40 to 55% by weight as compared to the water present.

The amount of gibberellic acid may vary appreciably as, for example, in the range from about 0.00004 gms./gal. to 2.66 gms./gal., preferably in the range from about .0004 gms./gal. to .0008 gms./gal. When utilizing a solution of this sort, the amount applied per acre is in the range from 100 gals. to 1000 gals., preferably in the range from about 325 to 600 gals./acre.

The gibberellins are part of a group of natural growth regulating hormone systems in higher plants (F. H. Stodola, "Source Book on Gibberellin" 1828–1957, Agric. Research Service, U.S. Dept. Agric., Peoria, Ill. 1958 and C. A. West, B. O. Phinney, Jr., American Chem. Society 81, 2424–1959). Gibberellic derivatives such as mineral ion salts may also be used. These mineral ion salts may comprise ammonium, Co, Rd, Cu, Mn, Pb, and sodium. In addition, the actyl, diacetyl, butyrl, benzoyl derivatives of gibberellic acid are also effective.

In order to further illustrate the invention, a number of experiments were carried out utilizing as a crop California Wonder Sweet Peppers. The amount of asphalt in the emulsion was bout 40 wt. percent and the amount of gibberellic acid present was about 2.66 gms./gal. The amount of emulsion utilized was about 300 to 400 gals./acre. The results of these tests are illustrated in the following data.

TABLE 1

| Group | Average Ht. After 10 Days, in | Range in Height, in | Inches Growth Over 10 Days Period | Av. Increase Over 10 Days Period |
|---|---|---|---|---|
| 1. Asphaltic Mulch with Gibberellic Treat, 73 mg./plant | 9.9 | 7–13 | 0.71 | 5.0 |
| 2. Asphalt Mulch | 6.4 | 4–13 | 0.33 | 2.3 |
| 3. No Mulch | 6.7 | 3–13½ | .30 | 3.0 |

TABLE 2

*Individual plant heights 10 days after test as compared to their original heights*

| Group | # Less than Double | # Double | # Greater than Double | # Triple | # Greater than Triple |
|---|---|---|---|---|---|
| 1. Gibb. Acid, 73 mg./plant in Asphalt Mulch | 1 | 1 | 3 | | 2 |
| 2. Asphalt Mulch | 5 | 1 | 1 | | |
| 3. No Mulch | 5 | 3 | 2 | | |

TABLE 3

| Group | Average Ht. After 12 Days | Range in Height, in. | Inches Growth/ Plant Over 12 Days Period | Average Increase Over 12 Days Period |
|---|---|---|---|---|
| 1. 73 mg. Gibb. Acid in Asphalt | 10.9 | 7½–15 | .86 | 6.0 |
| 2. Asphalt | 6.6 | 5½–13½ | .36 | 2.5 |
| 3. No Mulch | 7.2 | 3–15 | .35 | 3.5 |

TABLE 4

*Individual plant heights 12 days after tests as compared to their original heights*

| Group | # Less than Double | # Double | # Greater than Double | # Triple | # Greater than Triple |
|---|---|---|---|---|---|
| 1. Gibb. Acid and Asphalt | 1 | | 2 | | 4 |
| 2. Asphalt | 6 | 1 | | | |
| 3. No Mulch | 4 | 2 | 4 | | |

TABLE 5

*Individual plant heights after 13 days on test*

| Group | Less than Double | Double | Greater than Double | Triple | Greater than Triple |
|---|---|---|---|---|---|
| 1 | | 1 | 3 | | 3 |
| 2 | 5 | 1 | 1 | | |
| 3 | 4 | 3 | 3 | | |

TABLE 6

| Group | Average Hts. After 13 days on Test, in. | Range | Inches Growth/Plant Over 13 Day Period | Average Increase Hts. Over 13 Day Period |
|---|---|---|---|---|
| 1 | 11.3 | 8–15 | 0.91 | 6.4 |
| 2 | 6.9 | 4–14 | .40 | 2.8 |
| 3 | 7.3 | 3–15 | .36 | 3.6 |

Thus, after a 13 days test period, the results indicate that the Gibberellic Acid California Wonder Sweet Pepper Plants (containing an asphalt mulch) had an average higher growth rate of 228% when compared with plain asphalt mulch and 253% greater than pepper plants that were not mulched.

Additional tests were conducted utilizing as the crop Wonder Pepper Plants. The results of these tests are shown in the following tables.

TABLE 7

*Gibberellic acid experiment on California Wonder Pepper Plants*

| Plant No. | 73 mg. Gibb. Acid/plant/100 ml. of emulsion | | | | | | | 100 ml. Asphalt Mulch/Plant | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Days | Height in Inches | | | | | | | | | | | | | |
| 0 | 6 | 6 | 2¼ | 2¾ | 4 | 3 | 6¼ | 3½ | 2¼ | 4 | 3¼ | 2 | 9 | 4½ |
| 10 | 12 | 10 | 7 | 8 | 9 | 10 | 13 | 6 | 5 | 7 | 4 | 4 | 13 | 6 |
| 12 | 14 | 11 | 7½ | 8½ | 9 | 11 | 15 | 6 | 5½ | 7 | 4 | 4 | 13½ | 6½ |
| 13 | 14½ | 12 | 8 | 9 | 9½ | 11 | 15 | 6½ | 6 | 7½ | 4 | 4 | 14 | 6½ |
| 14 | 14½ | 12 | 8 | 9 | 10 | 11 | 15 | 6½ | 6 | 7½ | 4½ | 4 | 14½ | 6½ |
| 18 | 16 | 14 | 9½ | 9½ | 11 | 11 | 17 | 7 | 7 | 9 | 5½ | 4½ | 16 | 8 |
| 24 | 17½ | 17 | 10 | 12 | 14 | 11 | 20 | 8 | 9 | 11 | 8 | 5½ | 21 | 8 |
| 25 | 19 | 19 | 11½ | 12 | 14 | 11 | 21½ | 8½ | 11 | 11 | 8 | 6 | 22 | 8½ |
| 26 | 19 | 19 | 11½ | 12 | 14 | 12 | 21½ | 9 | 11 | 11½ | 8½ | 6½ | 23 | 8½ |
| 27 | 19 | 19 | 11½ | 12½ | 14 | 12 | 22½ | 9 | 11 | 12 | 8½ | 6½ | 23½ | 8½ |
| 28 | 19 | 19 | 12 | 13½ | 14½ | 12 | 22½ | 9 | 11 | 12 | 9 | 7 | 24 | 9 |
| 29 | 19 | 19 | 12 | 13½ | 15 | 12 | 22½ | 10 | 11 | 12 | 9½ | 7 | 24 | 9 |

TABLE 8

*Gibberellic acid experiment on California Wonder Pepper Plants*

[No Mulch]

| Plant No. | 15 | 16 | 17 | 18 | 19 | 20 | 21 | 22 | 23 | 24 |
|---|---|---|---|---|---|---|---|---|---|---|
| Days | Height in Inches | | | | | | | | | |
| 0 | 7½ | 2 | 3½ | 3½ | 3½ | 7½ | 2¼ | 4 | 1½ | 2 |
| 10 | 13½ | 3 | 8 | 7 | 7 | 11 | 4 | 6 | 3 | 4½ |
| 12 | 15 | 3 | 8 | 7½ | 8 | 13 | 4 | 6 | 3 | 4½ |
| 13 | 15 | 3 | 8½ | 7½ | 8 | 13 | 4½ | 6 | 3 | 4½ |
| 14 | 15 | 3½ | 8½ | 7½ | 8 | 13 | 4½ | 6 | 3 | 4½ |
| 18 | 15 | 4 | 10 | 9½ | 9½ | 15 | 5 | 7½ | 4 | 5 |
| 24 | 17 | 5 | 14 | 13 | 12 | 16 | 8 | 10½ | 4 | 6½ |
| 25 | [2]19 | [3]5 | [2]14 | [3]14 | [2]13 | [2]18 | [2]9 | [3]11 | [2]5 | [3]7 |
| 26 | 19 | 6 | 14 | 14 | 13 | 18 | 9 | 11 | 5 | 7 |
| 27 | 20 | 6½ | 14 | 14 | 13 | 18 | 9 | 11 | 5½ | 7½ |
| 28 [1] | 20 | 7 | 15 | 14 | 13 | 19 | 9 | 12 | 5½ | 8 |
| 29 | 20 | 7½ | 15½ | 14 | 13½ | 20½ | 10 | 12 | 5½ | 8 |

[1] All plants received a feeding of 50 gms. of Cottonseed meal (contains 41% protein or 7% nitrogen).
[2] 100 ml. distilled water/plant.
[3] Put on aqueous Gibb. Acid Test (73 mg./plant in 100 ml. distilled water).

The results of the foregoing may be summarized in the following tables.

TABLE 9

*Average growth in inches/plant/day over the following periods*

| | 10 Day Period | 18 Day Period | 24 Day Period | 29 Day Period | 31 Day Period |
|---|---|---|---|---|---|
| Gibberellic Acid in Asphaltic Mulch | 0.56″ | 0.46″ | 0.42″ | 0.41″ | 0.39″ |
| Asphaltic Mulch | 0.24″ | 0.23″ | 0.25″ | 0.27″ | 0.26″ |
| Not Mulched | 0.29″ | 0.26″ | 0.28″ | ([1]) | |

[1] Half of the number of plants were put on Aqueous Gibb. Acid.

TABLE 10

*Ratio of the average inches of height gained in plant groups from Table 1*

|  | 10 Day Period | 18 Day Period | 24 Day Period | 29 Day Period | 31 Day Period |
|---|---|---|---|---|---|
| Gibb. Acid in Asphaltic Mulch: Asph. Mulch | 2.33:1 | 2.00:1 | 1.68:1 | 1.51:1 | 1.50:1 |
| Gibb. Acid in Asphaltic Mulch: Not Mulched | 1.93:1 | 1.77:1 | 1.50:1 | (¹) | |
| Not Mulched: Asphaltic Mulch | 1.21:1 | 1.13:1 | 1.12:1 | | |

¹ Half of the number of plants were put on Aqueous Gibb. Acid.

TABLE 11

*Average growth in inches/plant/day over the following periods*

|  | 10 Day Period | 17 Day Period | 23 Day Period |
|---|---|---|---|
| Aqueous Gibb. Acid | 0.52 | 0.39 | 0.28 |
| No Gibberellic Acid | 0.35 | 0.28 | 0.18 |

TABLE 12

*Ratio of the average inches of height gained in plant groups from Table 1*

|  | 10 Day Period | 17 Day Period | 23 Day Period |
|---|---|---|---|
| Aqueous Gibb. Acid: No Gibb. Acid | 1.49:1 | 1.39:1 | 1.56:1 |

Thus, the present invention is concerned with the use of an acid, particularly gibberellic acid in conjunction with an asphalt emulsion wherein the aqueous phase is the continuous phase.

What is claimed is:

1. Improved asphalt composition for mulching seeded areas which comprises an asphalt-in-water emulsion containing a gibberellin selected from the class consisting of gibberellic acid, the mineral salts of gibberellic acid and the organic esters of gibberellic acid wherein the amount of gibberellin present is in the range from about 0.00004 gms./gal. to about 2.66 gms./gal.

2. Composition as defined by claim 1 wherein the amount of asphalt present in said emulsion is in the range from about 25 to 60% by weight as compared to the water.

3. Composition as defined by claim 2 wherein the amount of asphalt present as compared to the water is about 40 to 55% by weight.

4. Composition as defined by claim 3 wherein said asphalt is an acidic asphalt.

5. Composition as defined by claim 1 wherein said gibberellin is gibberellic acid and the amount of gibberellic acid present is in the range from about .0004 gms./gal. to .0008 gms./gal.

6. Improved process for mulching a seeded area which comprises coating said seed bed with an asphalt-in-water emulsion containing a gibberellin selected from the class consisting of gibberellic acid, the mineral salts of gibberellic acid and the organic esters of gibberellic acid wherein the amount of gibberellin present is in the range from about 0.00004 gms./gal. to about 2.66 gms./gal.

References Cited by the Examiner

UNITED STATES PATENTS

| 1,882,377 | 10/32 | Whittelsey | 71.2—2.1 X |
| 1,988,175 | 1/35 | Merrill | 47—9 X |
| 2,333,959 | 11/45 | Smith | 47—9 |
| 2,741,550 | 4/56 | Edmond et al. | 71—2.4 |
| 2,829,040 | 4/58 | Darin et al. | 71—2.5 |
| 2,842,051 | 7/58 | Brian et al. | 71—2.5 |
| 2,851,824 | 9/58 | Campbell | 71—1 X |
| 2,936,226 | 5/60 | Kaufman et al. | 71—1 |
| 2,974,030 | 3/61 | Geary. | |
| 2,995,433 | 8/61 | Goren et al. | 71—25 |
| 3,061,974 | 11/62 | Louis et al. | 47—9 |

OTHER REFERENCES

Smith (II): "The Effect of Asphalt Mulches on The Stabilization of Soils and Aggregate Materials and on Vegetational Cover," an abstract of a thesis, 1953, 11 pages.

LEWIS GOTTS, *Primary Examiner.*

MAURICE A. BRINDISI, *Examiner.*